US009240102B2

(12) United States Patent
Watkins et al.

(10) Patent No.: US 9,240,102 B2
(45) Date of Patent: Jan. 19, 2016

(54) METHOD, APPARATUS, AND PROGRAM PRODUCT FOR CONDUCTING A GAME USING BOTH UNISYMBOL AND MULTISYMBOL REEL EFFECTS

(71) Applicants: Brian A. Watkins, Austin, TX (US); Andrea R. Barton, Austin, TX (US)

(72) Inventors: Brian A. Watkins, Austin, TX (US); Andrea R. Barton, Austin, TX (US)

(73) Assignee: Everi Games Inc., Austin, TX (US)

( * ) Notice: Subject to any disclaimer, the term of this patent is extended or adjusted under 35 U.S.C. 154(b) by 373 days.

(21) Appl. No.: 13/758,589

(22) Filed: Feb. 4, 2013

(65) Prior Publication Data

US 2013/0150144 A1 Jun. 13, 2013

Related U.S. Application Data

(63) Continuation of application No. 12/139,841, filed on Jun. 16, 2008, now Pat. No. 8,366,535.

(60) Provisional application No. 60/987,592, filed on Nov. 13, 2007.

(51) Int. Cl.
*G06F 17/00* (2006.01)
*G07F 17/34* (2006.01)

(52) U.S. Cl.
CPC .................................... *G07F 17/34* (2013.01)

(58) Field of Classification Search
USPC .......................................... 463/16–25, 30–33
See application file for complete search history.

(56) References Cited

U.S. PATENT DOCUMENTS

| | | | | |
|---|---|---|---|---|
| 4,517,558 | A | 5/1985 | Davids | |
| RE34,244 | E | 5/1993 | Hagiwara | |
| 5,375,830 | A | 12/1994 | Takemoto et al. | |
| 5,609,524 | A | 3/1997 | Inoue | |
| 5,697,843 | A | 12/1997 | Manship et al. | |
| 5,725,428 | A | 3/1998 | Achmüller | |
| 5,984,782 | A | 11/1999 | Inoue | |
| 6,093,102 | A | 7/2000 | Bennett | |
| 6,120,378 | A | 9/2000 | Moody et al. | |
| 6,251,013 | B1 * | 6/2001 | Bennett | 463/13 |
| 6,702,675 | B2 | 3/2004 | Poole et al. | |
| 6,855,053 | B2 | 2/2005 | Baerlocher | |

(Continued)

OTHER PUBLICATIONS

International Search Report dated Dec. 29, 2008 for PCT international application No. for PCT/US2008/083133 (2 pages).

(Continued)

*Primary Examiner* — Ronald Laneau
(74) *Attorney, Agent, or Firm* — Nathan H. Calvert, Esq.; Russell D. Culbertson, Esq.; JP Cody, Esq.

(57) ABSTRACT

A novel game is provided that transforms at least a part of the graphic symbol matrix shown on a video-based reel-type gaming machine to change the game operation from multi-symbol reels to single-symbol reels. Methods, apparatus and program products for implementing the game are provided. A preferred game operates in a first display matrix state displaying a symbol matrix. The symbol matrix provides a game play result by displaying two or more reel representations that combine to form the symbol matrix. In response to a trigger event in game play, the game switches to a second display matrix state where it is modified to show single-symbol reel representations with separating elements between at least one pair of adjacent symbols of a respective reel representation. Multiple sets of data structures are provided for operation in each display state.

19 Claims, 11 Drawing Sheets

(56) References Cited

U.S. PATENT DOCUMENTS

| | | | | |
|---|---|---|---|---|
| 6,997,806 | B2 | 2/2006 | Falciglia, Sr. | |
| 7,001,274 | B2 | 2/2006 | Baerlocher et al. | |
| 8,753,191 | B2 * | 6/2014 | Panasenko et al. | 463/20 |
| 2004/0209668 | A1 | 10/2004 | Okada | |
| 2004/0214624 | A1 | 10/2004 | Moody | |
| 2005/0148381 | A1 | 7/2005 | Marks et al. | |
| 2007/0021189 | A1 | 1/2007 | Sato | |
| 2009/0124371 | A1 * | 5/2009 | Gilmore et al. | 463/27 |
| 2010/0234092 | A1 | 9/2010 | Gomez et al. | |
| 2012/0122544 | A1 * | 5/2012 | Roemer et al. | 463/20 |
| 2013/0150144 | A1 * | 6/2013 | Watkins et al. | 463/20 |
| 2014/0256405 | A1 * | 9/2014 | Owen et al. | 463/20 |

OTHER PUBLICATIONS

Written Opinion of the International Searching Authority dated Dec. 29, 2008 for PCT international application No. PCT/US2008/083133 (5 pages).

* cited by examiner

Copyright 2007, Multimedia Games, Inc.

Copyright 2007, Multimedia Games, Inc.

Copyright 2007, Multimedia Games, Inc.

Copyright 2007, Multimedia Games, Inc.

Copyright 2007, Multimedia Games, Inc.

METHOD, APPARATUS, AND PROGRAM PRODUCT FOR CONDUCTING A GAME USING BOTH UNISYMBOL AND MULTISYMBOL REEL EFFECTS

CROSS-REFERENCE TO RELATED APPLICATIONS

This application is a continuation of U.S. patent application Ser. No. 12/139,841, entitled "Method, Apparatus, and Program Product For Conducting A Game Using Both Unisymbol and Multisymbol Reel Effects" filed Jun. 16, 2008, and to be issued as U.S. Pat. No. 8,366,535, which claimed the benefit, under 35 U.S.C. §119(e), of U.S. Provisional Patent Application Ser. No. 60/987,592 filed Nov. 13, 2007, and entitled "Method, Apparatus, and Program Product for Conducting a Game Using Both Unisymbol and Multisymbol Reel Effects." The Applicants hereby claim the benefit of the above-identified nonprovisional application under 35 U.S.C. §120, and claim the benefit of the above-identified provisional application under 35 U.S. C. §119(e). The entire content of each of these prior applications is incorporated herein by this reference.

COPYRIGHT NOTICE

A portion of the disclosure of this patent document contains material which is subject to copyright protection. The copyright owner has no objection to the facsimile reproduction by any one of the patent documents or the patent disclosure, as it appears in the Patent and Trademark Office patent file or records, but otherwise reserves all rights of copyright.

TECHNICAL FIELD OF THE INVENTION

This invention relates to gaming systems and to gaming machines used to present gaming results. More particularly, the invention relates to methods for providing games having a display matrix linked at some game sequences to single-symbol reels and at other game sequences to multiple-symbol reels.

BACKGROUND OF THE INVENTION

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions, such as simulated horse races, in which wagers may be placed. Game manufacturers are continuously pressed to develop new game presentations, formats, and game graphics in an attempt to provide high entertainment value for players and thereby attract and keep players.

SUMMARY OF THE INVENTION

The present invention includes a highly entertaining method of presenting game results. The entertainment value is achieved by the transformation of at least a part of the graphic symbol matrix shown on a video-based reel-type gaming machine so as to change the game operation from multi-symbol reels to single-symbol reels. The present invention also encompasses methods for operating a gaming machine as well as both apparatus and program products for implementing the gaming machine operation methods.

A method embodying principles of the invention may be implemented in a gaming machine using one or more display devices such as CRTs, LCDs, plasma displays, or other types of video display devices. The display device or devices are used to show graphic elements according to the invention. As used in this disclosure and the accompanying claims, a gaming machine through which the present invention may be implemented will be referred to generally as a gaming machine regardless of the nature of the display device arrangement used to show results to the player.

One preferred method includes operating a gaming machine in a first display matrix state in which a display device associated with the gaming machine displays a symbol matrix. The symbol matrix provides a result for a game play initiated through the gaming machine. The result is provided by displaying two or more reel representations that combine to form the symbol matrix, each reel representation having at least two adjacent symbols. In response to a game activation, the method simulates rotation of reel representations to change the symbols in the matrix in which the display is modified to show separating elements between at least one pair of adjacent symbols of a respective reel representation. In response to a game activation in the second matrix state, the method simulates independent rotation of a single-symbol reel to change the symbol for at least one of the pair of adjacent symbol locations.

One preferred apparatus according to the invention includes a display device and a player input device associated with a gaming machine. This preferred apparatus also includes a presentation controller which may or may not be located at the gaming machine. The presentation controller is responsible for controlling the display device for displaying the graphical transformations of at least a part of the side graphics as described above. In particular, the presentation controller causes the display device to display a matrix of symbol locations in a first state, which includes two or more reel representations aligned along a common axis of rotation. Each of the reel representations displays at least two adjacent symbol locations of the matrix, and each symbol location displays a respective reel symbol. Responsive to a game activation while the matrix is displayed in the first state, the presentation controller causes the video display device to simulate the rotation of each reel representation to change the symbols displayed by the matrix of symbol locations. Responsive to a trigger event while the matrix is displayed in the first state, the presentation controller causes the video display device to modify the matrix to a second state in which a separating element is shown between at least one pair of adjacent symbol locations displayed by a respective reel representation. Responsive to a game activation with the matrix in the second state, the presentation controller causes the video display device to simulate an independent rotation for at least one of the symbol locations of a respective pair of adjacent symbol locations having a respective separating element shown there between, the simulated independent rotation changing the symbol displayed at the respective symbol location independently of any other symbol location in the matrix of symbol locations.

One preferred program product embodying the principles of the invention includes first display matrix state program code executable to cause a gaming machine to operate in a first display matrix state. In this state, a matrix of symbol locations is displayed by two or more reel representations aligned along a common axis of rotation, each reel representation displaying at least two adjacent symbol locations of the matrix, and each symbol location displaying a respective reel symbol. The reel representations are simulated to provide rotation of each reel representation, which changes the symbols displayed by the matrix. The program product includes second display state program code executable to cause the gaming machine to operate in a second display state in which a separating element is shown between at least one pair of adjacent symbol locations displayed by a respective reel representation, and in which an independent rotation is simulated for at least one of the symbol locations of a respective pair of adjacent symbol locations having a respective separating element shown there between. The simulated independent rotation changes the symbol displayed at the respective symbol location independently of any other symbol location in the matrix of symbol locations. The program product further includes display state control program code executable to cause the gaming machine to switch from the first display state to the second display state in response to a trigger event, and to cause the gaming machine to switch from the second display state to the first display state in response to a return event.

In various embodiments, the invention may include one or more of the following features. In response to a return event while the matrix is displayed in the second state, the game modifies the matrix to display the matrix of symbol locations again in the first state. When modifying the matrix to display the matrix of symbol locations in the second state, the invention may maintain each symbol shown in the matrix of symbol locations over the course of the modification. Symbols may be similarly maintained when changing from the second matrix state to the first matrix state. A separating element may be added to the display graphics to separate selected symbol locations in the second matrix state. Graphical sequences may be initiated to indicate changes from the first matrix state to the second, and vice versa. The first and second display matrix states may provide a game and a bonus round game, respectively, or may provide a game and an altered game having altered outcome probabilities.

These and other advantages and features of the invention will be apparent from the following description of the preferred embodiments, considered along with the accompanying drawings.

DESCRIPTION OF PREFERRED EMBODIMENTS

Figure 1:
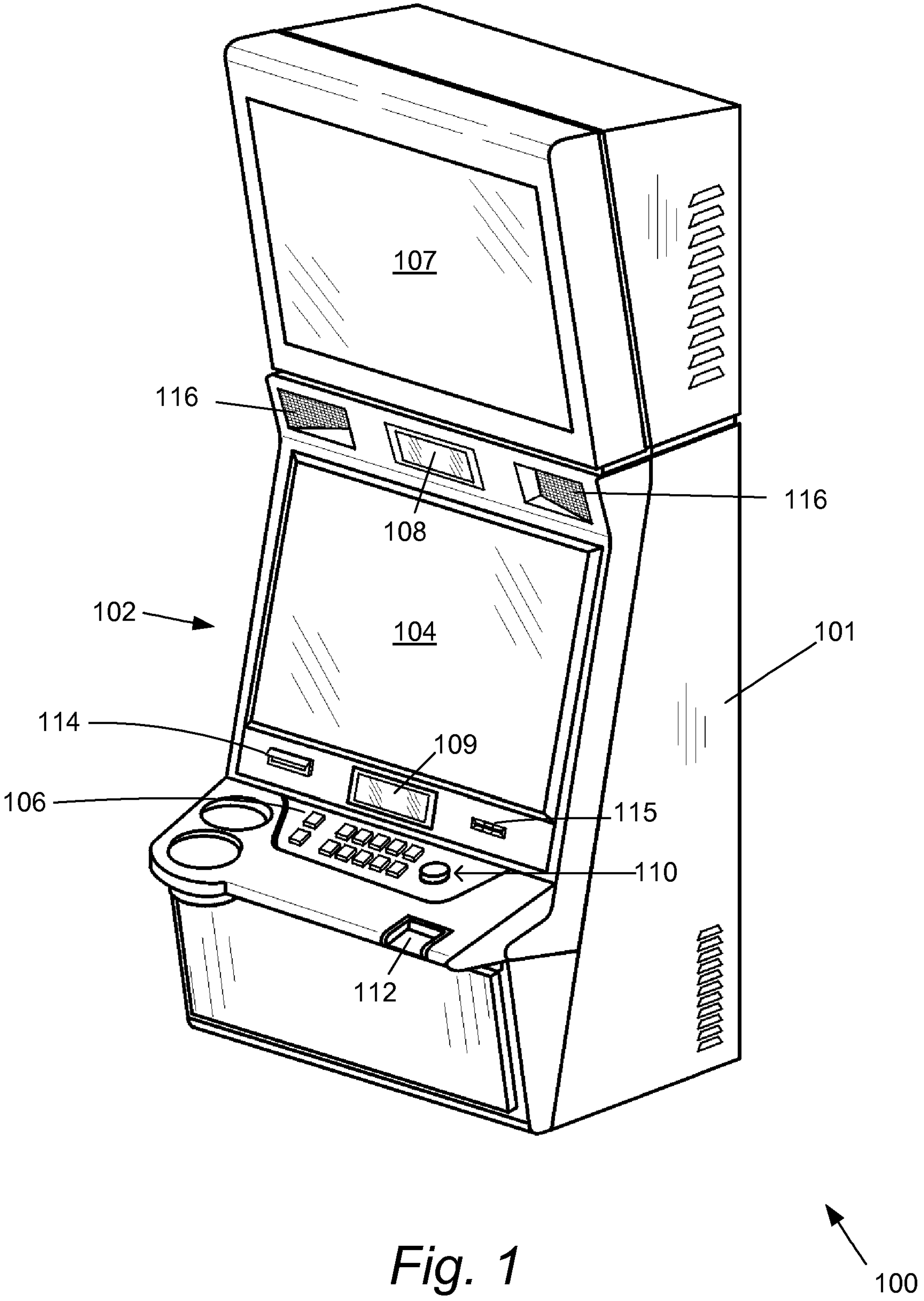
FIG. 1 is a view in front perspective of a gaming machine which may be used in a gaming system embodying the principles of the present invention.
Figure 2:
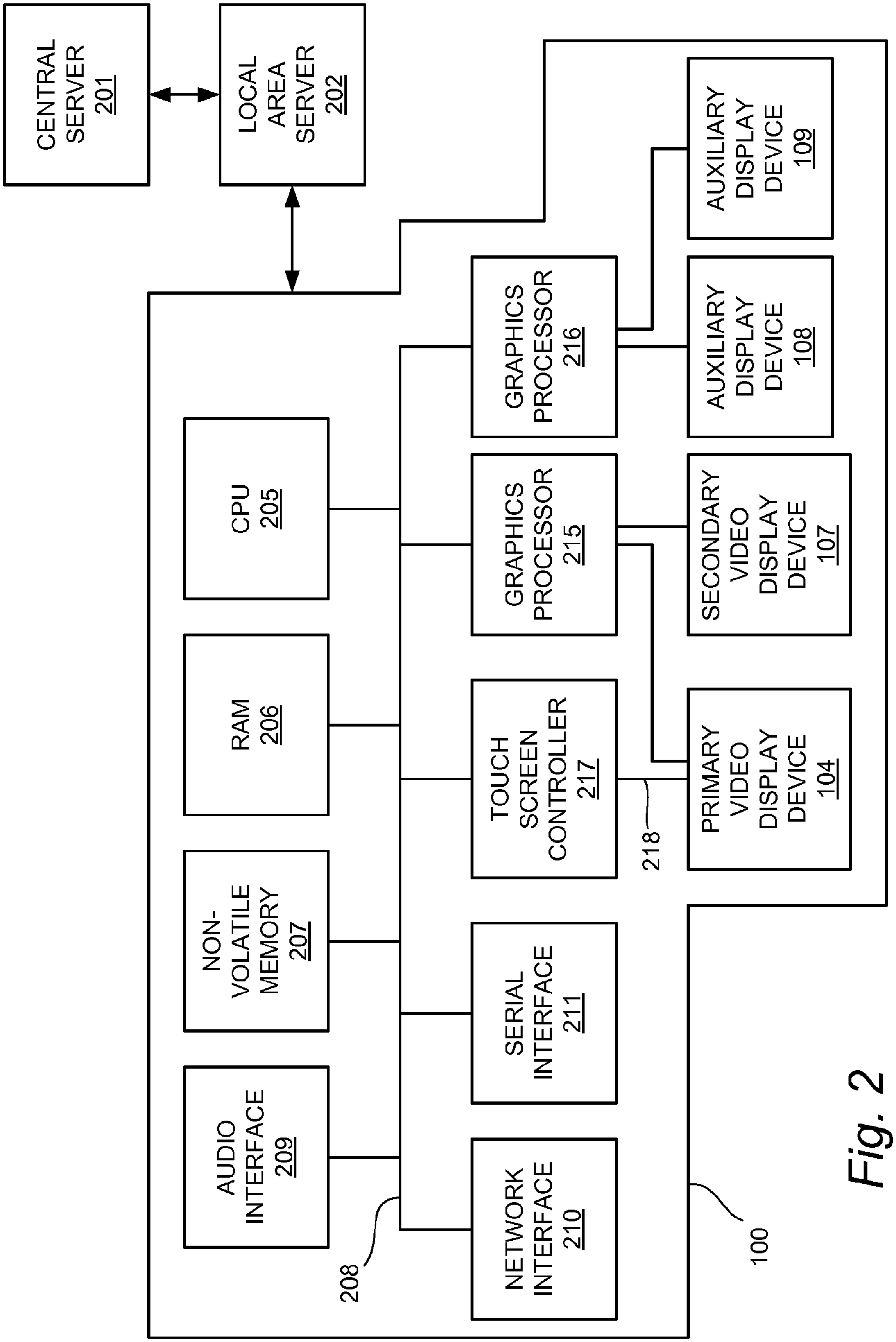
FIG. 2 is a diagrammatic representation showing various electronic components of the gaming machine shown in FIG. 1.

FIG. 1 shows a gaming machine 100 that may be used to present game results according to the present invention. The block diagram of FIG. 2 shows further details of gaming machine 100 connected in a gaming system in which the present invention may be used to present gaming results to players.

Referring to FIG. 1, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that the display devices used herein may include any suitable display device including a cathode ray tube, liquid crystal display, plasma display, LED display, or any other type of display device currently known or that may be developed in the future.

Gaming machine 100 illustrated in FIG. 1, also includes a number of mechanical control buttons 110 mounted on ledge 106. These control buttons 110 may allow a player to select a bet level, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 2 provides a block diagram showing various electronic components of gaming machine 100. In particular, FIG. 2 shows that gaming machine 100 includes a central processing unit (CPU) 205 along with random access memory (RAM) 206 and nonvolatile memory or storage device 207. All of these devices are connected on a system bus 208 with an audio interface device 209, a network interface 210, and a serial interface 211. While a single system bus is shown, of course architectures with north and south-side busses with their accompanying interface chipset(s) are also contemplated. A graphics processor 215 is also connected on bus 208 and is connected to drive the primary video display device 104 and secondary video display device 107 (both mounted on cabinet 101 as shown in FIG. 1). A second graphics processor 216 may also be connected on bus 208 to drive auxiliary display devices, such as devices 108 and 109 shown in FIG. 1. Some embodiments may include fewer auxiliary devices. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio interface 209, for example, may be connected to the system via a PCI bus. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with the gaming machine 100.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a display control client component for performing functions associated with a shared image game according to the present invention. CPU 205 also executes software related to communications handled through network interface 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device, a form of nonvolatile computer readable media, providing storage for programs not in use or for other data generated or used in the course of gaming machine operation. Network interface 210 provides an interface to other components of a gaming system such as the servers discussed below in connection with FIG. 3A.

Figure 3A:
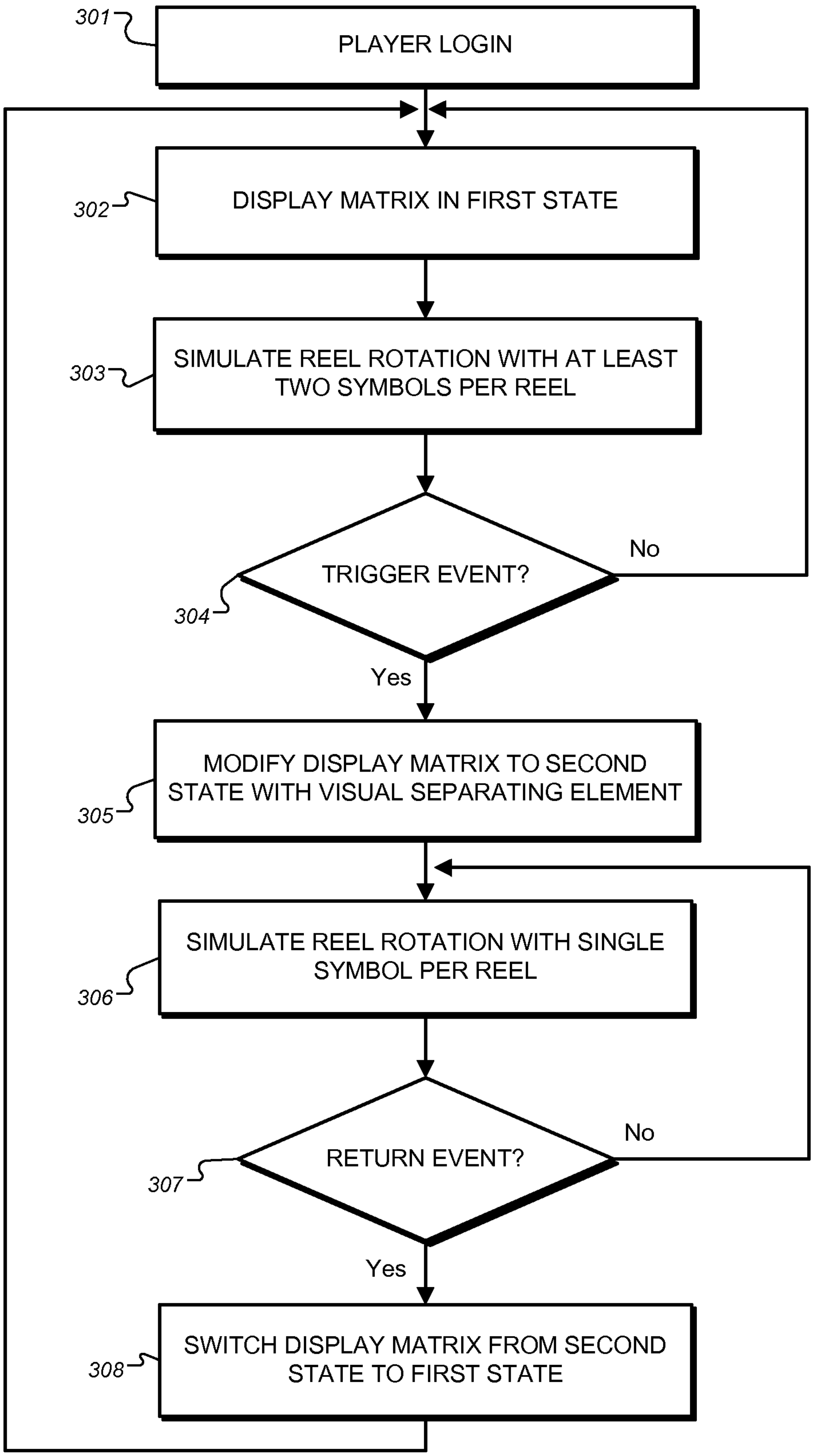
FIG. 3A is a flow chart showing game operation according to one embodiment of the invention.
Figure 6:
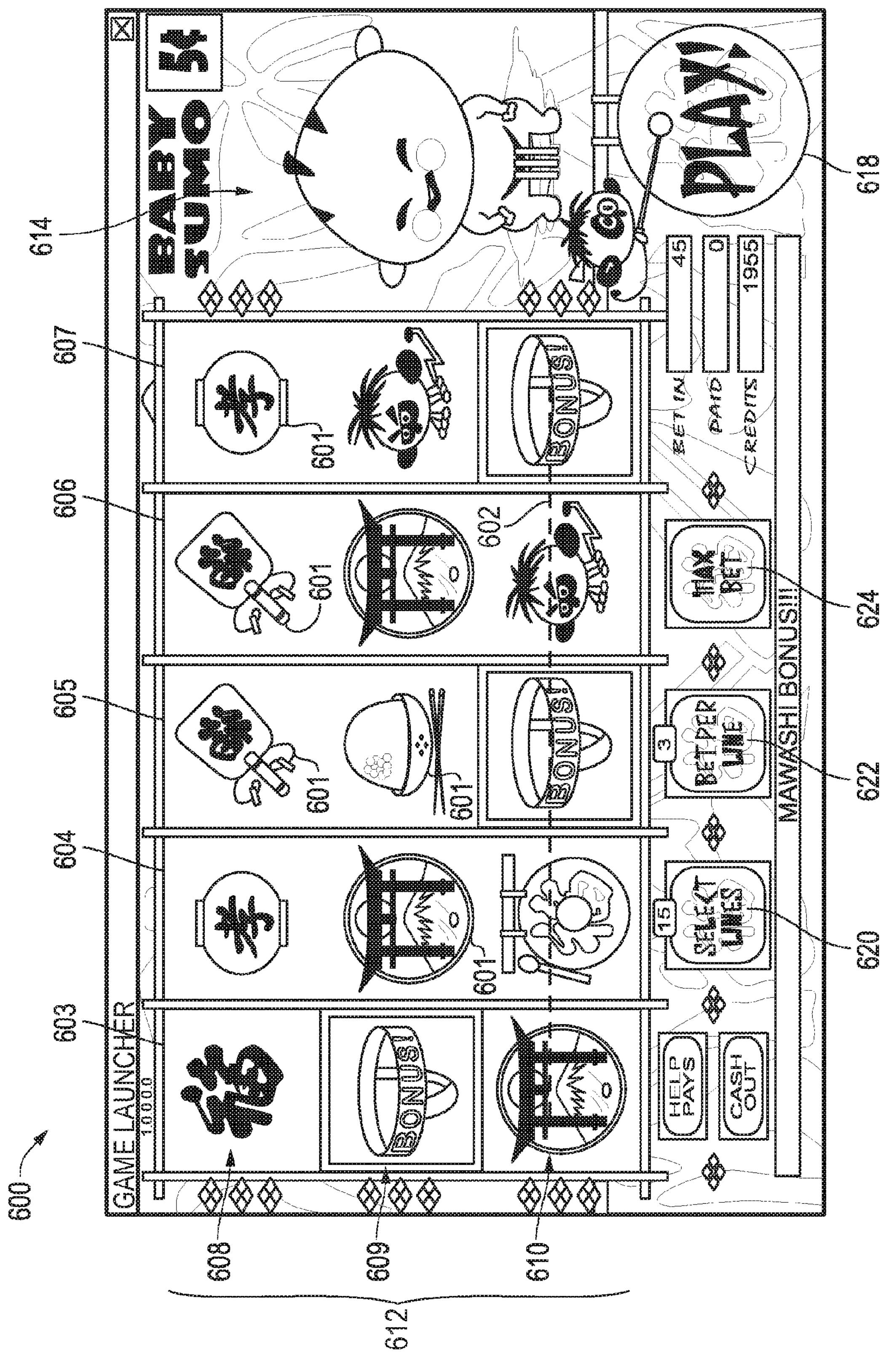
FIG. 6 is a representation of a graphic display having a display matrix in a first state.

FIG. 3A is a process flow chart showing the operation of a gaming machine according to one form of the present invention. The gaming machine may be of the type shown as gaming machine 100 in FIGS. 1 and 2 for example. The process begins with a player login as shown at process step 301 in FIG. 3A. The gaming machine begins operation by presenting a matrix of gaming symbols in a first state in step 302. The first state includes adjacent symbol locations in the matrix being linked to multi-symbol reel simulators. The first state also includes, in this implementation, displaying reel representations having at least two adjacent symbols, with a visual indication that the two adjacent symbols are part of the same simulated reel. In response to a game activation, in step 303, the process simulates reel rotation of some or all displayed reels, such as those displayed in columns 603-607 (FIG. 6). After the rotation, the process presents the game results by stopping the reel simulation to show the desired symbols at their respective symbol locations in the matrix. Various simulators may simulate rotation with speed variation such as slowing before stopping. The reel simulators in this state have at least two symbols per reel, although more symbols per reel may be required to achieve simulation effects.

Gaming machine operation at step 303 generally includes a series of steps representing a single game cycle, with results presented to the player. The game cycle will typically include some player input representing a game play request at the gaming machine to initiate a game play. This input may be entered in any suitable fashion at the gaming machine and may include one or more separate inputs. For example, a particular gaming machine could require that a player make some input to select one or more paylines to place in play, select a wager level per line, and actually play the selected bet by touching a button or other input to provide a game activation. All of these inputs are entered at a suitable input device at the gaming machine, such as the one or more input devices 110 shown in FIG. 1 and/or a touch screen associated with a game display such as primary video display device 104 as discussed above in connection with FIG. 2. Other embodiments employ a much more streamlined input procedure for initiating a game play. For example, a given game play may be initiated by simply activating a "play" button included in player input devices such as input devices 110 in FIG. 1 and/or included in a touchscreen display.

Unless an error occurs, a user game activation causes a game play. The result for the game play in step 302 is displayed with the display matrix in the first state. According to this embodiment, the result will be displayed at least partially through a symbol matrix in which at least one reel representation shows at least two symbol locations of the symbol matrix. This may be referred to as multi-symbol reel simulation results. The display matrix is updated to provide symbol changes according to the reel simulation results. An example of such a display is further described below with respect to FIG. 6. In one preferred embodiment, a presentation controller either located at the gaming machine (such as gaming machine 100 shown in FIGS. 1 and 2) or located at a central server or local area server (such as servers 201 and 202, respectively, in FIG. 2), causes a display device to display the matrix of symbol locations in the first state. Preferably, the first state is shown during rotation and while displaying resulting symbols. This may be accomplished by display control scripts determining a sequence of display events. The presentation controller selects a script at random from a number of available scripts mapped to the particular game outcome determined by the random number drawn. A first group of scripts is provided for play in the first display matrix state, the scripts controlling display of reel representations for multi-symbol reels. A second group of scripts is provided for play in the second display matrix state, these scripts for controlling display of the reel representations for uni-symbol reels. Preferably multiple scripts are provided for each possible prize outcome in each state. The display control scripts are further described below with regard to FIG. 3B.

Referring to FIG. 3A, at step 304 a game result, or other event or sequence of events, may produce a trigger event. In response to a trigger event, as indicated by a positive result at decision step 304, gaming machine 100 switches from the first matrix display state to a second matrix display state as shown at process step 305, and the gaming machine begins operating in the second matrix display state as shown at process step 306. This state, as will be further described below, includes operation with single symbol reel simulators. The process next identifies whether a return event has occurred as shown at decision step 307. If a return event has not occurred, then gaming machine 100 continues to operate in the second matrix state, or, if a return event has occurred, the matrix state switches back to the first state as shown at process step 308.

Referring still to FIG. 3A, any suitable event that may be employed as a trigger event is detected at step 304 to cause gaming machine 100 to switch from the first matrix display state to the second matrix display state. For example, a game pattern, result level, a matching symbol at a particular location, game data matching a particular designation, or some number of consecutive losing plays, or winning plays, or any other characteristic associated with one or more plays in the first matrix state may be used as a trigger event. A preferred game uses a particular bonus outcome associated with a bonus pattern for a trigger event. Other forms of the invention may use some event unrelated to a play at the first matrix state to represent a trigger event. For example, a trigger event for a given gaming machine may be generated randomly at the gaming machine or elsewhere, or produced according to some schedule based on time or the number of plays at the gaming machine or some group of such machines.

Regardless of the trigger event used in the decision at step 304, the switching of states indicated at step 305 is preferably performed in response to a trigger event signal generated as appropriate for the particular trigger event. For example, a particular pattern of bonus symbols may provide a triggering event. As another example, three wins in a row at the first matrix state may represent a trigger event. In such case, the gaming machine processor such as processor 205 in FIG. 2, or some other processing device such as local area server 202 or central server 201, includes a process that counts the number of consecutive wins and generates a trigger event signal when the desired number of consecutive wins occurs at the gaming machine.

The modification at step 305 is further described below, but essentially includes associating symbol locations in the display matrix to single-symbol reels (or reel simulators in preferred embodiments). Single-symbol reels (or "uni-symbol reels") are known in the art. They contain multiple symbols, only one of which is shown as the reel output symbol. Associating a single-symbol reel to a symbol location includes causing the reel output symbol to be displayed at the symbol location. The modification in step 305 preferably includes adding a visual separator to indicate that selected adjacent symbol locations in the matrix are now linked to separate reels. Instead of a visual separator, the modification may change the display to provide a separate reel representation for each symbol location in the matrix.

After the matrix display state switch in step 305, the game simulates the reel movement for the newly-linked single-symbol reels at step 306. This provides results with characteristics of single-symbol reel games. Game play continues in the second matrix state until a return event is detected at step 307. The return event triggers a switch in the matrix state back to the first matrix state as shown in step 308.

The variations described above in connection with the trigger event also apply to the return event triggering return to the first matrix state. Regardless of the specific event or series of events recognized as a return event, an appropriate component at the gaming machine or elsewhere preferably generates a suitable return event signal and communicates the return event signal as necessary to the system component serving as the presentation controller. The presentation controller then responds to the return event signal by switching from the second matrix state to the first matrix state at process step 308. Further description of the switch from first state to the second state, and back, are provided with reference to FIGS. 4 and 5.

In implementations with general purpose processing devices such as the devices shown in the example gaming machine 100 of FIG. 2, the various steps shown in FIG. 3A are performed under the control of operational program code. One preferred form of the invention executes first matrix state program code to cause gaming machine 100 to operate in the first matrix state. Second matrix state program code is executed to cause gaming machine 100 to operate in the second matrix state. Play mode control program code is executed to cause gaming machine 100 to switch from the first matrix state to the second matrix state in response to the trigger event, and to cause the gaming machine to switch from the second matrix state to the first matrix state in response to a return event. All of this program code may be executed by processor 205 associated with gaming machine 100 as shown in FIG. 2. In this case, processor 205 represents the presentation controller included in the invention. As indicated previously however, the invention is not limited to a presentation controller including a general purpose processing device, and is not limited to a presentation controller implemented at gaming machine 100. Rather, the functions of the presentation controller described above particularly in connection with FIG. 3A, may be performed at a processing device remote from gaming machine 100. For example, local area server 202 or central server 201 shown in FIG. 2 may represent the presentation controller according to some preferred forms of the invention. The presentation controller functions may also be split between multiple processing devices within the scope of the present invention.

As used herein, the first and second display states are not necessarily associated with particular "game states," which usually involves a change in winning probabilities, the mapping of events to outcomes and prizes, the potential prizes for player bets, or other game behavior. The preferred embodiment provides the second display state as a bonus round with several free spins, all within the context of a single game play cycle. However, other embodiments may provide the second display state along with a change in game state. For example, the second display state may provide a wagering game with an alternate prize table.

Figure 3B:
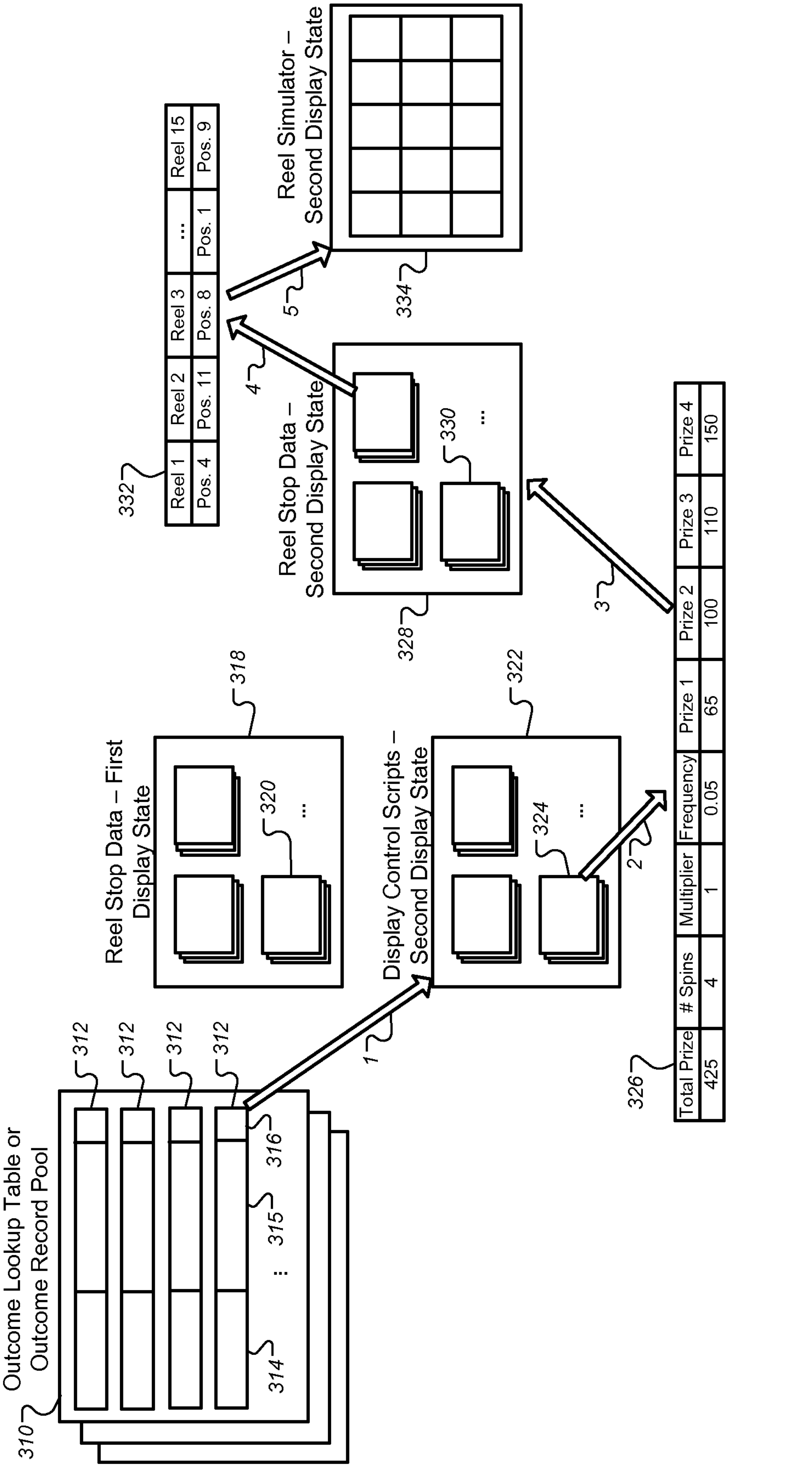
FIG. 3B is a data structure diagram for various data structures employed in one example game sequence.

FIG. 3B is a data structure diagram of various data structures employed in one example game sequence for generating and displaying results in the second display state. This is merely one example implementation, and one of skill in the art will understand from the remaining disclosure that many other implementations are possible to achieve similar results. The arrows in FIG. 3B depict the order in which the various data structures are used. The depicted data structures are used, for example, in one preferred game version where a standalone type machine uses a random number generator running on the gaming machine. A generated random number is used to index a table to lookup an outcome. In such a version, the outcomes are stored in a lookup table 310 which is indexed by the random number to provide suitable distributed, randomly-selected results. The lookup table has a number of outcome entries 312, each with an index 314, a prize amount 315 in credits, and a free-spin bonus flag 316. The outcome entry may have other data fields to control other parts of the game. The free-spin bonus flag 316 indicates that the record outcome is a trigger event that activates the second display mode discussed above.

As one alternative to a game outcome determined by random number, some games may have an outcome record pool of predetermined outcomes in place of the lookup table 310. In those games, an outcome record 312 (rather than a lookup table entry) is chosen from record pool 310 in response to a game play request. Still other embodiments may use a server-hosted bingo game with multiple game play requests participating as bingo cards, the bingo patterns determining prize outcomes. Referring to an outcome record pool 310, such record pool may be stored at a game server and accessed with game play requests from the gaming machine, or the server may allocate groups of outcome records to be stored and used locally at a gaming machine. In either case, the depicted game sequence provides an outcome record 312 in response to a player game play request, such as pushing the spin button to make a wager. An outcome record 312 is chosen from the pool either randomly or from a randomly-organized queue. The chosen record has a record identifier 314 (rather than an index 314 as used in the first embodiment of FIG. 3B), a prize amount 315 in credits, and a free-spin bonus flag 316. The outcome record data object may have other data fields to control other parts of the game. The free-spin bonus flag 316 indicates that the record outcome is a trigger event that activates the second display mode discussed above. A preferred embodiment displays an outcome in the first display state to indicate a trigger event (FIG. 6, for example), and then a graphic sequence such as that described with regard to FIGS. 7 and 8. The first display state outcome may include no prize (as indicated by the flag 316), or may include a separate base-game prize.

After displaying the base game result and graphic sequence to indicate a trigger event (FIG. 3A), the game proceeds to the sequence of FIG. 3B for operation in the second display state. In this example game, the second display state operation includes free bonus spins. Other embodiments may include wagers in the second display state. To start the free spins in the second display state, the presentation controller uses the prize amount field 315 to select a display control script from a group of scripts 322. This step is indicated by the arrow labeled "1."

The selection process at arrow 1 may be made in any suitable manner that selects a display control script to display the free-spin bonus outcome based on the outcome record. The selected script is used to control the display to provide an exciting series of events in the free-spin bonus round. A preferred control sequence proceeds as follows. The gaming machine presentation controller uses the prize amount 315 to select a set 324 of display control scripts from the group 322. The group 322 has multiple sets. The selected set 324 includes, in this example version, all display control scripts that have a total prize outcome equal to the prize amount 315. The set 324 preferably includes many display control scripts that each one uses a different sequence of events to indicate the total prize amount. This helps provide variety and excitement to the game. For example, suppose the selected game outcome entry or record 312 is a free-spin bonus result having a prize amount 315 indicating a 425 credit prize. The presentation controller looks to the group of display control scripts 322 and finds the set of scripts 324 that all have a total prize value of 425 credits. The presentation controller then randomly selects from this set, preferably by generating a random number and using it as an index to identify a particular script. Any suitable random selection or randomization step may be used, or a predetermined sequence may also be used if it is long enough that no pattern is discernable during player use of the gaming machine. In any event, a single display control script 326 is chosen from the set 324 for use in displaying the free spin bonus round results to the player. This is indicated by the arrow marked "2."

A display control script 326 chosen by arrow 2 for the free spin bonus round includes, in this version, the depicted data fields. Other fields may also be included, and some fields are not absolutely necessary; for example the Total Prize field may be indicated merely by presence in a set 324 all having a particular total prize. This version includes the total prize field in the display control script for tracking purposes. The script 326 contains a "# Spins" field to indicate the number of free spins in this bonus round. Preferred versions have four spins if wagering below "max bet" level, and five free spins if playing at the "max bet" level. The free spin bonus is only available, in the preferred embodiment, when a player is betting on max lines. A Multiplier field may be used to indicate the total prize has been altered by some multiplier caused by other elements in the game. This depicted example has a unit multiplier (1) which does not alter the prize. The Frequency field indicates a number indicating the hit frequency or probability that this particular script will be selected from the set 324. The depicted example shows a 0.05 Frequency value, indicating that this script will be shown 5% of the time that a total prize of 425 credits is awarded in a free spin bonus round. This hit frequency is preferably controlled through selection by an evenly-distributed random number, but may be enforced by other suitable methods, including random number based methods or methods that rigidly enforce the hit frequency. Finally, the script 326 includes a group of spin result indicators that tell how to divide the total prize between all the spins in the bonus round. The depicted spin result indicators Prize 1-Prize 4 show the results awarded for each free spin in the bonus round. These may have a zero value individually but must add up to the total prize value.

The presentation controller employs the script 326 in controlling display of a free spin sequence. Such control is accomplished, in this version, by selecting reel stop data objects 332 from a group 328 of reel stop data objects. This selection step is indicated at arrows 3 and 4. The depicted reel stop data object group 328 holds sets of data indicating the reel positions at which the simulated reels will stop after simulating spinning. The group 328 contains sets 330 of reel stop data objects, each set having all the objects that convey a particular value in the uni-symbol reel mode (the second display state). The presentation controller iterates through each of the spin results (Prize 1-Prize 4) in the display control script 326 and selects a reel stop data object 332 to display that result. For example, the first bonus spin in the depicted script 326 has a spin result of a 65 credit prize. The presentation controller uses this value to select a reel stop data object 332 to show a reel spin and stop with a 65 credit award.

Such selection preferably proceeds as follows. Using the spin result value of 65 credits in this example, the presentation controller identifies a set 330 of reel stop data objects, all having a 65 credit outcome (such as a winning pattern with a 65 credit award). The group 328 includes multiple sets. From the selected set 330, the presentation controller randomly selects a particular reel stop data object 332, preferably through generating a random number to use as an index from the set 330 (a similar process to selection of scripts 326 from script sets 324 described above). Other random selection processes may be used, or, as described above, a suitable sequence may be provided which is not random but appears so to the player. In any event, the presentation controller displays the present spin result by selecting a reel stop data object 332, as indicated at arrow 4.

The reel stop data object contains a reel stop position for each reel in the simulated reel display. In the preferred game, the second display state has 15 uni-symbol reels, so the reel stop data object 332 stores 15 positions (Reel 1-Reel 15). The presentation controller uses this data to reel stop positions for reel simulator 334. The activation of reel simulator 334 to spin and stop at the stored reel stop positions is designated by the arrow marked "5."

After each simulated spin and stop, the presentation controller awards any prize and then continues to display further spin results stored in script 326 using the same depicted process (arrow 3 through arrow 5) until all are displayed. The final free bonus spin (in this example, spin 4 based on the listed Prize 4) constitutes the return event from the second display state to the first display state. In response to this event, the presentation controller displays a return sequence (such as that shown in FIG. 10) and returns to the first display state for further wagering.

In this embodiment, game operation in the first display state proceeds as a simplified version similar to game operation in the second display state. Game results may be determined by random number generation, predetermined outcome records, or bingo games, for example. Results are displayed by reel stop data randomly from sets 320 in the group 318 of reel stop data for the first display state. Note that each display state has a group of reel stop data objects. The reel stop data objects included therein have, in a preferred embodiment, only 5 positions, one each for the 5 multi-symbol reels used in the base game. Of course, other numbers of reels may be used.

Preferably, the display states have different display symbols in the different display states. Many symbols may be common between the two states.

As previously described, some alternative games may provide for wagers in the second display state. In those cases, a second lookup table or outcome record pool may be used for the second display state, with some entries or records containing return event flags that trigger a return to the first display state. The outcomes (payouts) and their relative frequencies may vary between those outcome tables or record pools.

Figure 4:
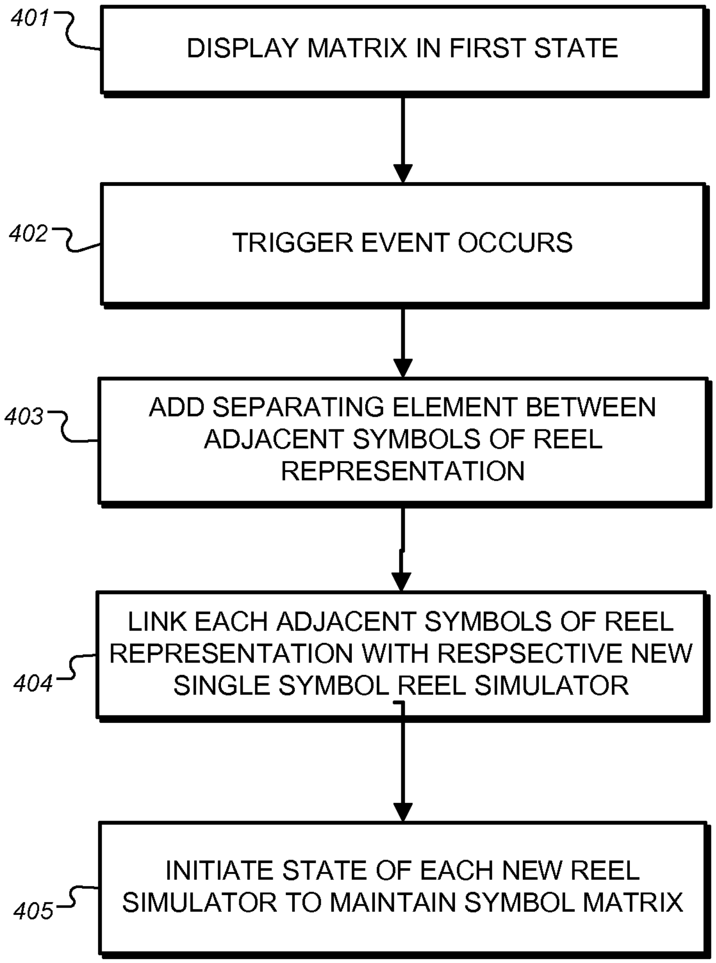
FIG. 4 is a flow chart showing game operation for switching to a second display matrix state.

FIG. 4 is a process flow chart of a display matrix state change from a first state, with multi-symbol reels, to a second state, with single-symbol reels. The steps 403-405 in this flow chart are one example of actions which may occur inside step 305 of FIG. 3A. The process begins in step 401 with the game operating in the first display matrix state. In step 402, a trigger event occurs as described above with regard to FIG. 3A. Next, in step 403, the presentation controller adjusts the display graphics to add a symbol separating element between designated symbol locations. This serves as a visual indicator to the player that the symbol matrix has changed. The separating element may be an added line, color change, or other suitable indicator. The separator appears between adjacent matrix symbols that previously, in the first matrix state, were linked to adjacent symbols on the same simulated reel. Preferably, multiple separation elements appear because all matrix symbols are being linked to single-symbol reels. In one preferred embodiment, a multimedia sequence is also initiated at this point to announce the state change and direct player attention to the separating element.

After the separating element is added, step 404 changes the matrix to link symbol locations to single-symbol reel simulators. Preferably, all matrix symbol locations are so linked. However, this is not limiting and other embodiments may link less than all of the display matrix symbol locations. For example, in a game display in which the first matrix state includes three symbol columns displaying results of three multi-symbol reel representations, various embodiments may switch one or two of the symbol columns to link the symbol locations to three single-symbol reels. One embodiment accomplishes the switch in step 404 by linking output of designated single-symbol simulators in software to the individual matrix symbol locations. In various embodiments, the single symbol reel simulators may be newly-instantiated software objects, or may be previously instantiated simulators or repurposed multi-symbol reel simulators. Other embodiments may not need to provide a dedicated reel simulator, but merely change a software flag, commanding a simulator subroutine or method to simulate a reel of a certain type. Such embodiments may employ a simulation routine to simulate reel movement and position and store the resulting symbol in a memory location associated with the symbol, with no separate memory dedicated to hold simulator states after exiting the subroutine. In reel simulators with repeated symbols, a position may also be stored to uniquely identify the simulation result if needed.

Step 405 initiates the state of each single-symbol reel simulator such that the current symbol is the one already displayed in the matrix. Some embodiments may forego this step and allow the matrix symbols to change at the display matrix state change.

While the three steps implementing the display matrix state change are shown in a particular order (403, 404, and 405), this is not limiting and the steps may be performed in any functional order. During game play in a preferred embodiment, no sequential order to these steps is perceivable by the player, the matrix state switch being accomplished following a particular designated graphics sequence.

Figure 5:
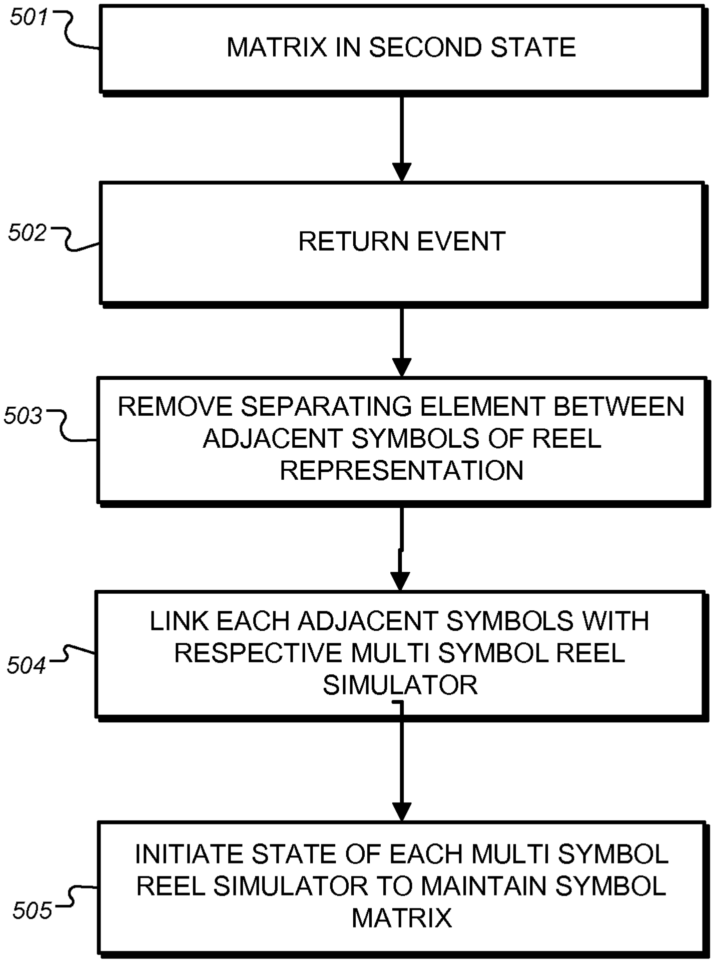
FIG. 5 is another flow chart showing game operation for switching to a first display matrix state.

FIG. 5 is a process flow chart of a display matrix state change from the second state, with single-symbol reels, to the first state, with multi-symbol reels. The steps 503-505 in this flow chart are one example of actions which may occur inside step 308 of FIG. 3A. The process begins in step 501 with the game operating in the second display matrix state. In step 502, a return event occurs as described above with regard to FIG. 3A. Next, in step 503, the presentation controller adjusts the display graphics to remove the separating elements. This serves as a visual indicator to the player that the symbol location matrix has changed back to multi-symbol reels.

After the separating elements are removed, step 504 changes the matrix to associate symbol locations to multi-symbol reel simulators. Preferably, all symbol locations are changed in this manner. One embodiment accomplishes the switch in step 505 by linking output of designated multi-symbol reel simulators to columns of symbol locations. As described above, switching the link or association of symbol locations to simulators may be accomplished in various ways, including software simulators or state command flags activating varying functions of a simulation subroutine, for example.

While linking symbol locations to various reel simulators is described herein, various embodiments may or may not provide game results based directly on the reel simulators. Preferred embodiments provide random game results by selecting a random number which indicates a total prize to be awarded from the prize distribution. The reel stop pattern is then selected to match that prize. Therefore, reel simulators in this embodiment simulate rotation and then display the pattern matching the results achieved by the selected random number. In various implementations, random numbers may be provided by a random number generator on gaming machine 100, or local area server 202 or central server 201.

In some embodiments, different prize probabilities are provided when operating in the first matrix state and the second matrix state. For example, when in the first matrix state, a random number may be drawn having a first set of probabilities associated with an outcome. The second state may provide a second set of probabilities associated with the game outcome, different from the first set. These first and second sets may be associated with a main game and a bonus round game, for example.

Other embodiments may draw the game outcome directly from random simulation of the reels, whether in the first or second matrix states. In such embodiments, the game outcome probabilities are based at least partially on the simulated reel results, as opposed to forcing or "mapping" a simulated reel result to fit a game outcome achieved through a different process.

Another example embodiment employs a bingo game as a base game engine for determining game outcomes. The bingo game results are then "mapped" to the reel representations according to earlier described methods, or other method of representing the random game outcome with a variety of presentations. The first and second matrix states may represent results from similar bingo games, or different bingo games such as games with differently sized cards, differing free spaces, or other variations.

Step 505 initiates the state of each multi-symbol reel simulator such that the current symbol is that already displayed in the matrix. This maintains the state of the display matrix so game symbols do not change until a new play is initiated. Some embodiments may not have multi-symbol reel representations with symbol sequences matching every possible combination from the single-symbol reels. In such cases, a middle row match procedure may be used, or a minimal-change match or other suitable procedure may be used. Where game mathematics allows, step 505 may also reorder symbols in the multi-symbol reels to match those in the matrix display. Further, some embodiments may not provide matching at this step, in which case the displayed symbols in the matrix of symbol locations may change at the matrix state change. During game play in a preferred embodiment, no sequential order to these steps is perceivable by the player, the matrix state switch being accomplished following a particular designated graphics sequence.

FIG. 6 is a representation of a graphic display 600 that may be produced in a method embodying the principles of the invention when gaming machine 100 is operating in the first matrix state. The graphic display shown in FIG. 6 is a video reel-type display that includes a number of reel symbols 601. Such a graphic display may be generated on a video display device such as video display device 104 shown in FIGS. 1 and 2 in connection with example gaming machine 100. The reel symbols 601 are provided in symbol locations arranged vertically in columns 603, 604, 605, 606 and 607. Each column, in the display matrix state depicted here, simulates a spinnable reel such as the mechanical reel on a mechanical reel-type machine (slot machine). The reel symbols are also arranged in horizontal rows 608, 609 and 610. This combination of columns and rows represents a display matrix 612 of symbol locations. As shown in FIG. 6 the display matrix 612 is created by the combination of five columns and three rows of reel symbols 601, each occupying a symbol location, for example only and not by limitation. Preferably, the simulated reels are aligned so that they spin about a common axis of rotation.

A game play is initiated typically through a player game activation at gaming machine 100. The example game result shown graphic display 600 is produced by first causing the five simulated reels defined by columns 603, 604, 605, 606 and 607 to appear to spin and then come to rest with a particular set of reel symbols 601 and/or blanks lined up along one or more paylines 602 defined through display matrix 612. Reel symbols 601 that line up along the payline(s) indicate the result for the game play. A payline may be defined in any manner including two or more symbols as are known in the art. The depicted payline 602 is shown with a dotted line for example only, the dotted line not typically being part of the game. A given result can also be displayed by "scatter" symbols displayed anywhere in display matrix 612 and not necessarily in any line or set relationship. For example the three "Bonus!" mawashi symbols present in the depicted matrix may represent a type of result.

In addition to display matrix 612, the video device used to generate the graphic display image also provides additional graphic elements around the periphery of the display matrix. In particular, side graphics 614 illustrate a graphical theme, in this example game, having a Japanese-themed graphic including a "Baby Sumo" wrestler. All of the side graphics are consistent with the theme. Obviously, other themes may be used in other implementations. In this regard, the side graphics may consist entirely of abstract artwork and colors. Further, the side graphics may include one or more repeating figure or design icons or touch screen elements shown generally in area 614 that are consistent with the theme and may be used to facilitate player inputs in the course of play at gaming machine 100. "Play" button 618 in the form of a gong, may be invoked by a player to initiate a game play at gaming machine 100. "Select Lines," "Bet Per Line" and "Max Bet" buttons 620, 622 and 624, respectively, in the form of hanging wooden signs may also be invoked to choose a bet level in the process of initiating a game play at gaming machine 100 employing graphic display 600. FIG. 6 also shows other player control touch screen buttons/icons "Cash Out" and "Help Pays" to invoke other common functions available in gaming machine 100 and other types of gaming machines. All of these side graphics 614, however, are part of a graphical theme as presented in a first matrix state on at least two sides of the display matrix 612.

While the depicted graphics in FIG. 6 are on one screen, this is not limiting and various embodiments may provide graphic elements on other screens. For example, top glass 107 (shown in FIG. 1) may be replaced with an active display showing game graphics. Or, additional displays may be placed at ledge 106, for example. The additional displays may show the "bet in," "paid," and "credits" elements, or may show other game results. In some embodiments, an upper display 108 may display bonus round game graphics, or a secondary game, for example.

The display matrix 612 is shown in the first display matrix state as described herein. This means that columns 603-607 are, in one embodiment, each linked to a single respective multi-symbol reel simulator. The vertical combination of symbols in column 603, for example, is three adjacent symbols on a multi-symbol simulated reel.

Figure 7:
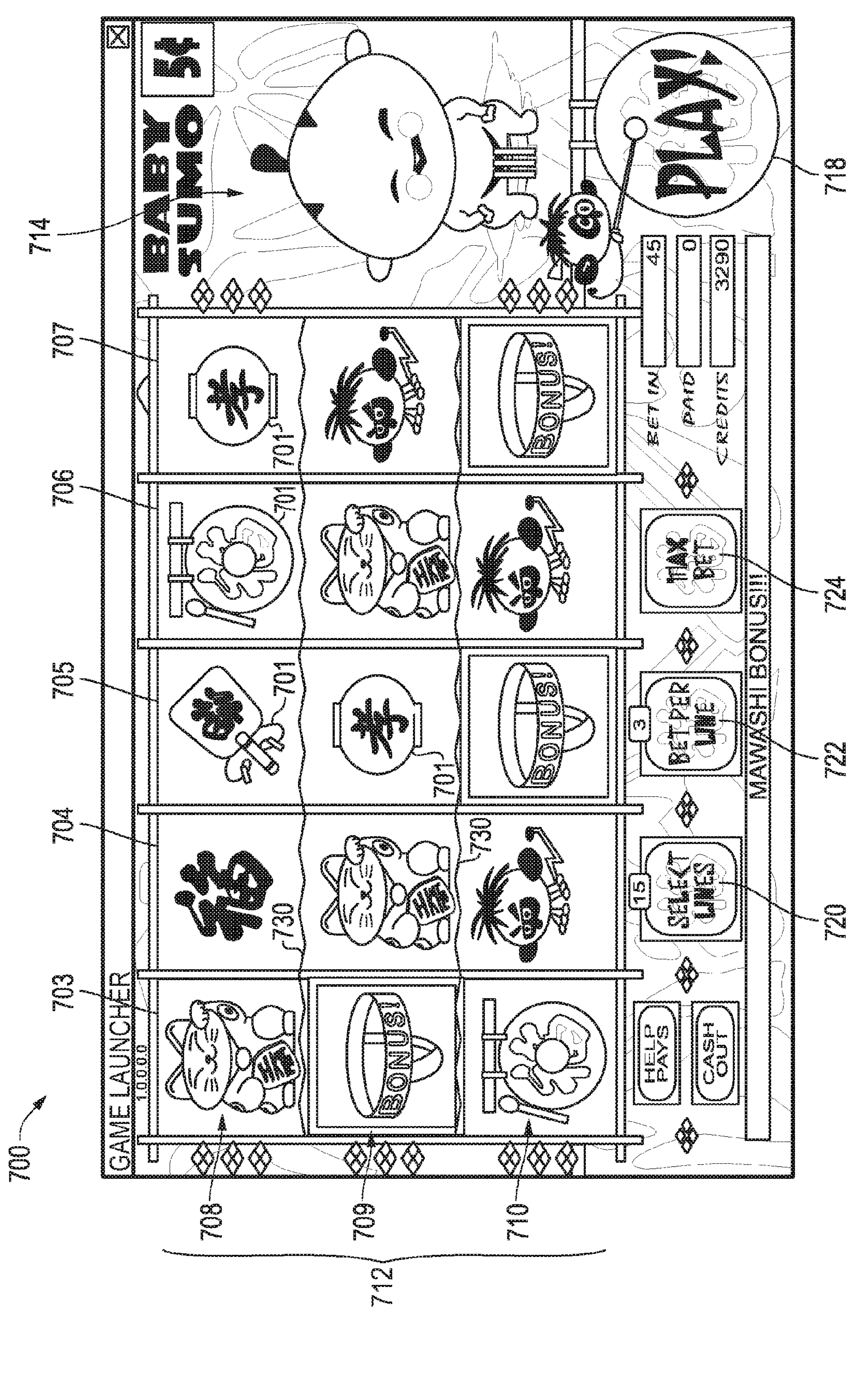
FIG. 7 is a representation of a graphic display having a display matrix in a second state.

FIG. 7 shows a representation of a graphic display 700 that may be produced when the gaming machine (such as gaming machine 100 shown in FIGS. 1 and 2) is operating in the second matrix state according to the present invention. Graphic display 700 is similar to graphic display 600 with a number of reel symbols 701 arranged in five columns 703, 704, 705, 706 and 707. Three rows 708, 709 and 710 are also displayed. In the depicted second display matrix state, each graphic symbol 701 is linked to a single-symbol reel, which is simulated to spin independently of the adjacent symbols in its column.

Additional graphic elements are included in this particular example of graphic display 700 that indicate to the player that gaming machine 100 is in the second matrix state. The display matrix 712 is the same type of display as matrix 612 in FIG. 6 but an additional graphic element is being added in the form of separating elements 730, depicted as jagged lines or cracks separating vertically adjacent symbol locations in matrix 712. The addition of these additional separating elements 730 is facilitated by the use of a video display to generate graphic display 700. The separating elements 730 indicate that the display matrix is in a uni-symbol reel simulation mode.

Some embodiments include a transitional graphic sequence to show a change from the first display matrix state of FIG. 6 to the second display matrix state of FIG. 7. A preferred sequence shows the depicted "Baby Sumo" character, in response to the three scattered mawashi "Bonus!" symbols, jumping offscreen, returning with his mawashi belt, and striking a formidable pose. The character lifts one leg and stamps down on the floor, creating a tear between one pair symbol location rows, as depicted by separating elements 730, and lifts and stamps the other leg to create the second depicted tear. This sequence may be employed as the "add separating element" step 403 (FIG. 4).

Figure 8:
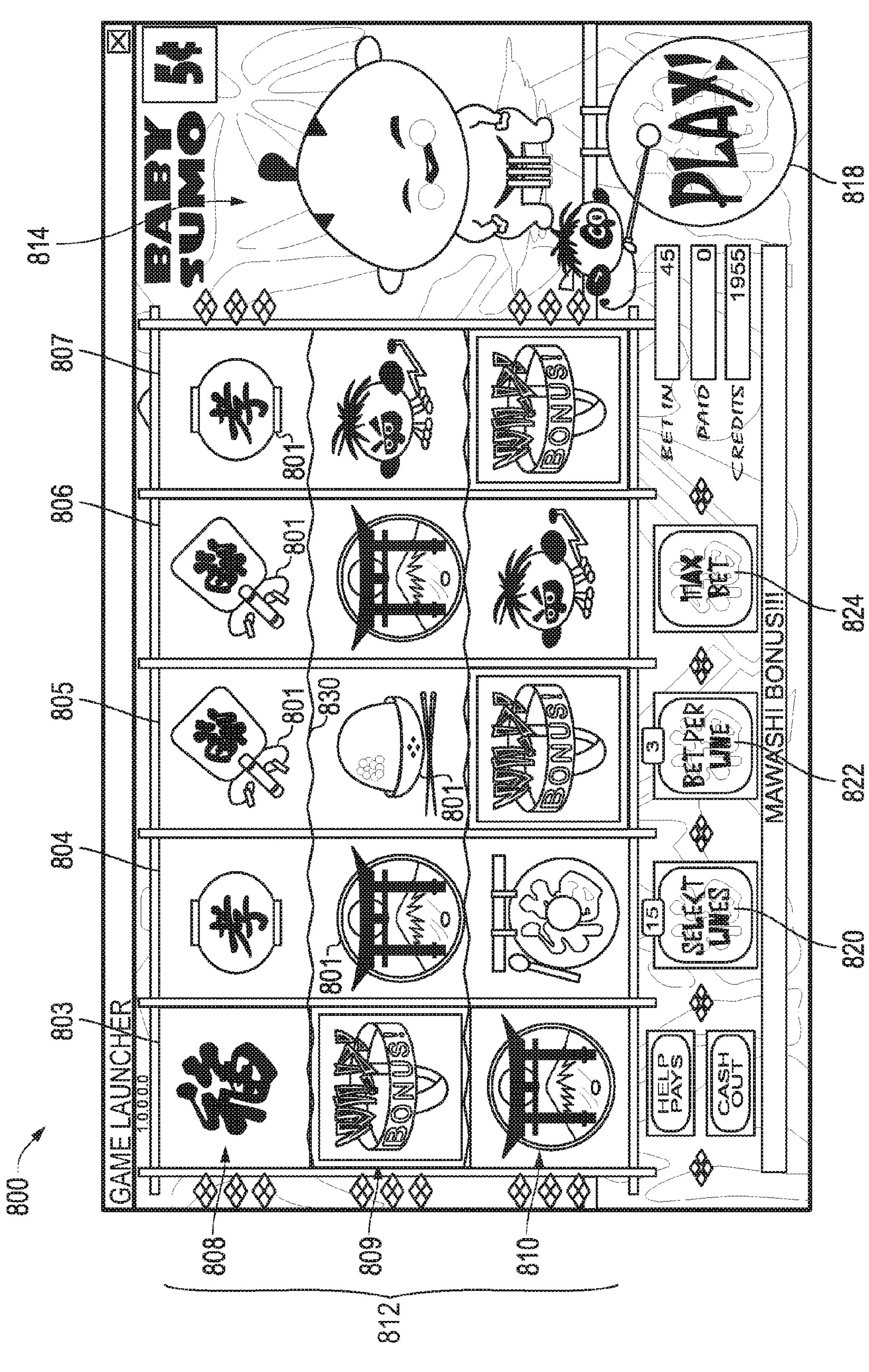
FIG. 8 is a representation of a graphic display having a display matrix in a second state with a bonus game result showing.

FIG. 8 shows a representation of a graphic display 800 that may be produced during game play in the second matrix state according to one embodiment. Graphic display 800 is similar to graphic displays 600 and 700 with a number of reel symbols 801 arranged in five columns 803, 804, 805, 806 and 807, each representing a spinnable reel. Three rows 808, 809 and 810 are also displayed. However, the mawashi graphic symbols 801 that indicated the matrix change, are displayed with a "Wild!" label. This indicates, in a preferred game, that these symbols have been designated as "wild," typically indicating that they may be combined with any symbol to form a possible winning pattern. In a preferred embodiment, the "wild" symbols are locked and do not change their display while the remaining symbols 801 spin independently in the second display matrix state game play.

In one game, a graphic sequence includes the "Baby Sumo" character clapping his hands following the leg stamping sequence. In response to the hand clap, either 1, 2, or 3 of the mawashi symbols will turn wild and lock in place as described above. In this particular game, the single-symbol reel simulations are used during "free spin" plays. The player is awarded "free spins" by forming a pattern with the mawashi symbols, which scatter across columns 803, 805, and 807 when playing a 15 line game. The player is awarded five free spins when betting at max bet level, and four free spins if playing below max bet. Because three mawashi symbols are not present on the reels during free spins, the player cannot win more free spins during the bonus.

Figure 9:
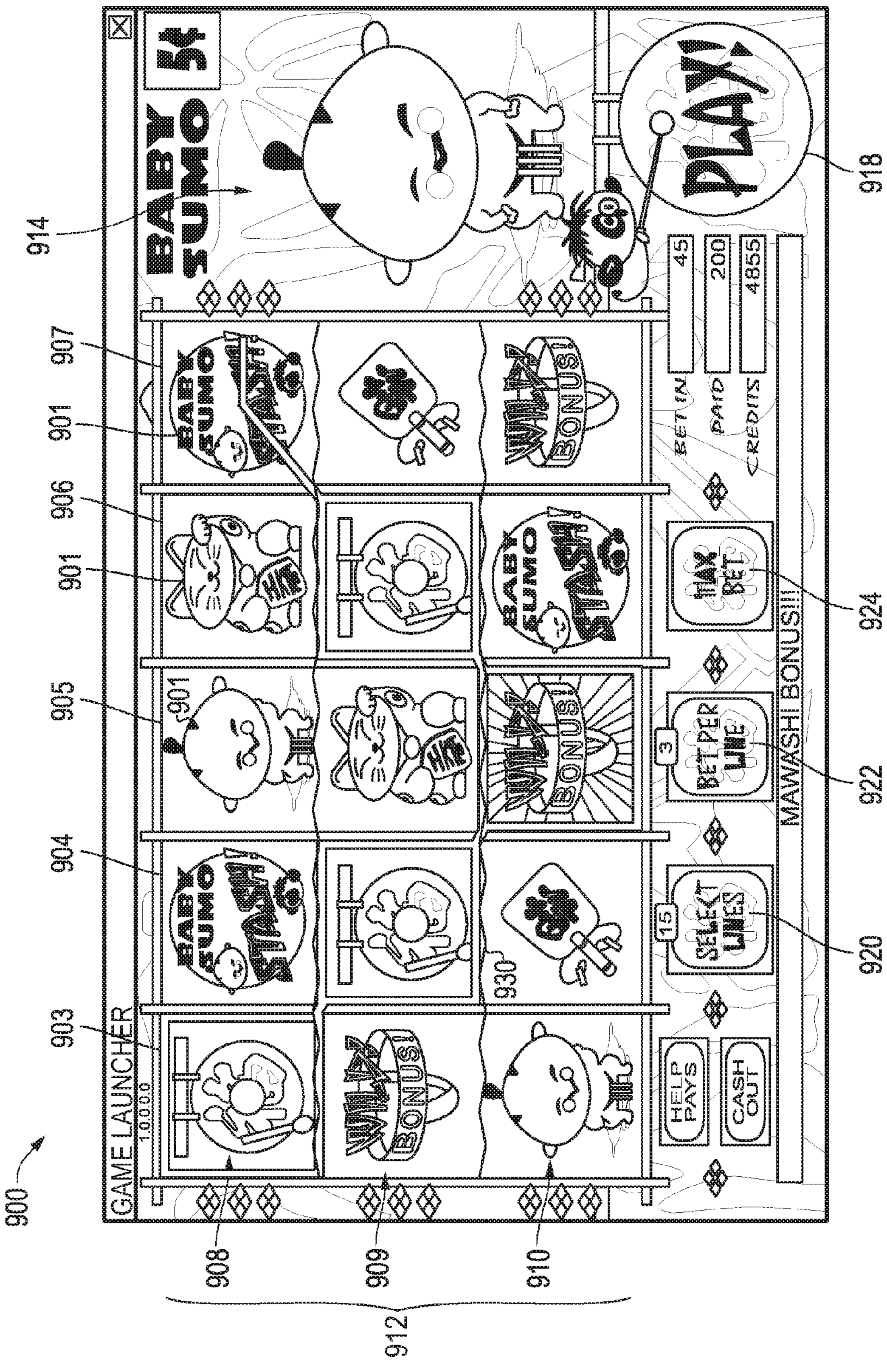
FIG. 9 is a representation of a graphic display having a display matrix in a second state showing a winning pattern.

FIG. 9 shows another graphic display 900 resulting from a game play in the second matrix state. The depicted game result shows a winning pattern formed in matrix 912. In particular, the depicted winning pattern symbols 901 are shown boxed in and linked together by pattern designator 932. The winning pattern includes the central-lower depicted "Wild" symbol from FIG. 8. The depicted winning pattern was formed by simulating single-symbol reel movement for each depicted symbol location, except those designated as "Wild."

Figure 10:
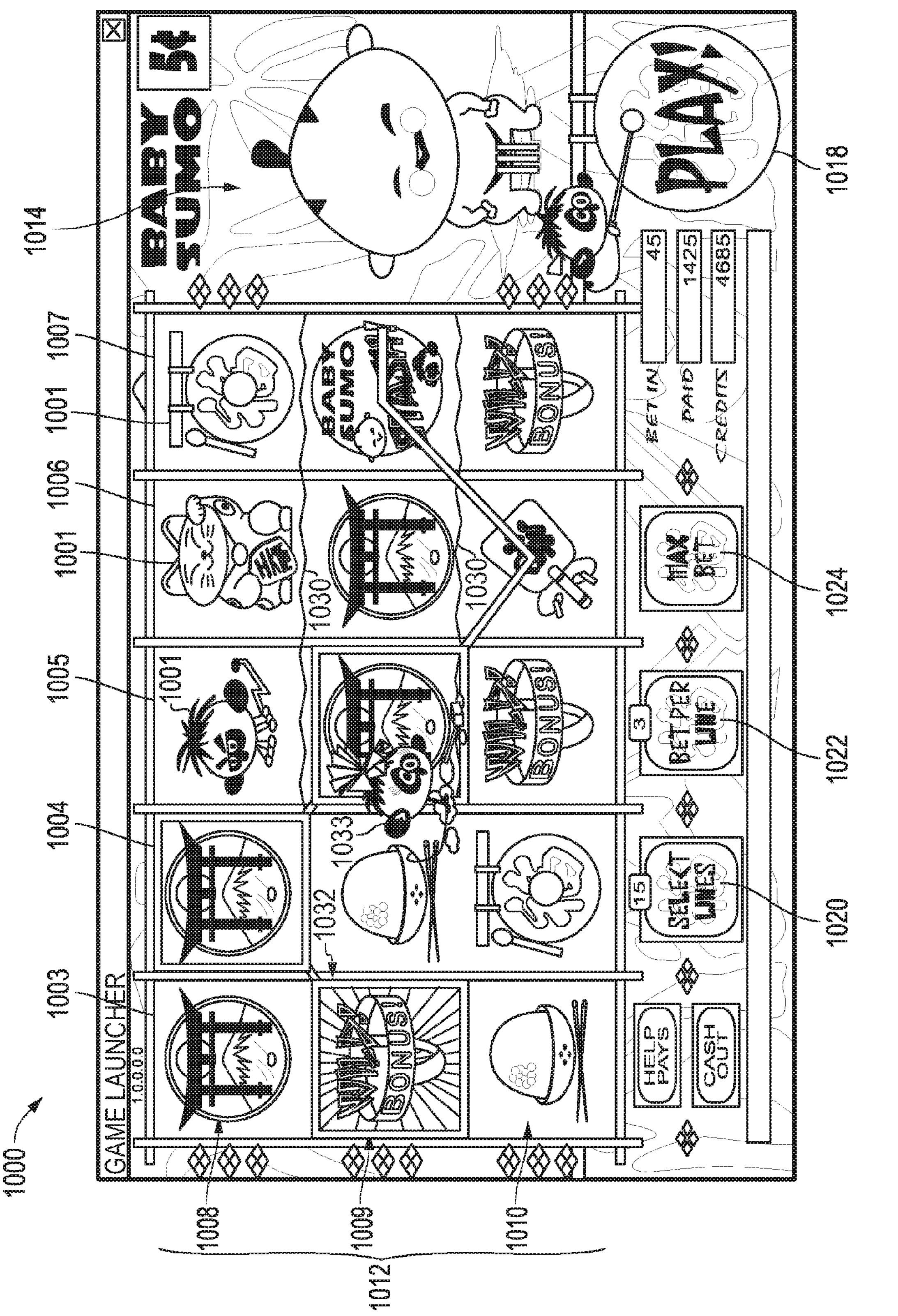
FIG. 10 is a representation of a graphic display having a display matrix in transition from a second state to a first state.

FIG. 10 shows another graphic display 1000 in the process of changing the display matrix 1012 from the second state to the first state. Depicted is winning pattern designator 1032 connecting several symbols 1001. In this sequence, the game outcome produced a return event, which could be the result of the winning pattern, or some other event or sequence resulting from previous game play. The return event activates a display matrix state change back to the first display matrix state, in which the vertical columns 1003-1007 are each linked to a respective multi-symbol reel simulation.

The state change is shown to the player, in this embodiment, by removing the separator elements 1030 from the display. Depicted is a game character 1033 with a graphic of a broom. The character sweeps across the screen to remove the separator elements 1030. The FIG. 10 graphic display shows this sequence in process with separator elements 1030 partially removed. This process is one embodiment of step 503 (FIG. 5), removing the separator elements. After removal, the process continues to switch the display matrix symbol locations to operate with the multi-symbol reels of the first matrix state, rather than the single-symbol reels of the second matrix state.

The return event for the example shown in FIG. 10 may be simply a loss in the second matrix state. That is, in the event that the play in the second matrix state produces a pattern that is not correlated to any winning result, such a result in the game is considered a return event and results in the gaming machine being switched back to the first matrix state as indicated at process block 308 in FIG. 3A. The return event might alternatively include the completion of a number of plays at the second matrix state. Any other return events may be appropriate as well as desired for a particular game.

The example displays shown in FIGS. 6-10 are shown only as convenient examples for describing the principles of the invention. Many variations on these basic examples may be employed within the scope of the present invention. In particular, the invention is not limited to any particular manner for displaying the results for the game play. Other graphic displays may include more or fewer reel simulations or one or more different paylines. Furthermore, other forms of the present invention may allow only a single bet level and may not provide different prizes displayed on different wager/bet levels.

It should be noted that restrictions may be placed on bet levels available in matrix states that are more favorable to the player. In particular, a gaming machine implementing the present invention may be programmed or otherwise operated to prevent a player from increasing their bet level when play is switched to a matrix state that is more favorable to the player. In one arrangement for preventing an increase of bet levels in a more player-favorable matrix state, the presentation controller may take an increased bet level in a player-favorable matrix state as a return event to cause play to switch back to the less favorable matrix state. The player may be warned through a display such as primary video display 104 in FIGS. 1 and 2, before switching back to the less favorable matrix state, and allowed an opportunity to withdraw the increased bet. Alternatively, the gaming machine may simply not accept an input that attempts to increase the bet level in the more player-favorable matrix state, and/or may lock the bet level in to that bet level which is in effect at the time of the trigger event for all game plays initiated in the more player-favorable matrix state.

It should be noted that the invention is not limited to gaming machines employing the personal computer-type arrangement of processing devices and interfaces shown in example gaming machine 100. Other gaming machines may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is only necessary that the gaming machine include one display device that is capable of producing the single machine component of the shared image graphic effect according to the invention. For example, a gaming machine suitable for use in the invention may include a mechanical reel-type display rather than a video-type display device for displaying results in a primary game. Thus, a gaming machine suitable for use in the present invention may have a structure similar to that shown for gaming machine 100 in FIG. 1, but with a mechanical reel-type display replacing the primary video display device 104.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method performed on an electronic gaming machine, the method including:

(a) displaying a matrix of a set number of symbol locations on an electronic display, the symbol locations arranged in rows and columns for displaying graphic symbols to communicate results for a wagering game;

(b) receiving a first game activation input from a player through a player input system of the gaming machine, the first game activation input requesting a spin of the matrix of symbol locations, and in response updating the matrix by simulating symbols being moved and stopped as multi-symbol reels to provide a first result for the first game activation input;

(c) in response to a first trigger event in the first result, altering the matrix of symbol locations to operate as simulated uni-symbol reels by associating a uni-symbol reel simulator with each existing symbol location in the matrix, and stopping the simulation of multi-symbol reels, and showing a graphic sequence designed to indicate to the player that uni-symbol reels are now being employed; and (d) after (c), receiving a second game activation input from the player through the player input system, the second game activation input requesting a spin of the matrix of symbol locations now simulating uni-symbol reels, and in response, updating the matrix by visually simulating uni-symbol reels being spun and stopped in each symbol location.

2. The method of claim 1 further including:

(a) in response to a second trigger event while the matrix of symbol locations is simulating uni-symbol reels, altering the matrix of symbol locations to return to operation as simulated multi-symbol reels by associating a multi-symbol reel simulator with each existing column of symbol locations in the matrix, and stopping the simulation of uni-symbol reels, and showing a graphic sequence designed to indicate to the player that multi-symbol reels are now being employed; and (b) in response to a subsequent game activation input, operate a subsequent game with the matrix of symbol locations simulating multi-symbol reels spinning and stopping to provide a subsequent game result.

3. The method of claim 1 further including, when altering the matrix of symbol locations to operate as simulated uni-symbol reels, initiating the state of each simulated uni-symbol reel to maintain each symbol previously shown in the matrix of symbol locations over the course of the modification.

4. The method of claim 1 further including, when altering the matrix of symbol locations to operate as simulated uni-symbol reels, randomly changing each symbol shown in the matrix of symbol locations over the course of the modification.

5. The method of claim 1 further including, when altering the matrix of symbol locations to operate as simulated uni-symbol reels, modifying a set of potential symbols for display at each symbol location.

6. The method of claim 1 further including, when altering the matrix of symbol locations to operate as simulated uni-symbol reels, modifying game conditions to provide an altered set of game outcome probabilities.

7. A gaming machine comprising:

a set of multi-symbol reel simulators for simulating spins of slot machine reels having multiple displayed symbol locations;

a set of uni-symbol reel simulators for simulating spins of reels having single displayed symbol locations;

a gaming display including a matrix of symbol locations for presenting graphic symbols to a player to communicate game results, the matrix having multiple rows and columns of symbol locations; and a presentation controller operable to alter the gaming display to change the matrix of symbol locations back and forth from a first state in which the columns are linked to the multi-symbol reel simulators for visually simulating spinning and stopping multi-symbol reels to provide game results, to a second state in which the multi-symbol reel simulators are unlinked from the matrix, and each symbol location is instead linked to a respective one of the uni-symbol reel simulators for visually simulating spinning and stopping uni-symbol reels to provide game results.

8. The gaming machine of claim 7, wherein the presentation controller is operable to display a first graphic sequence of steps occurring when the gaming display is altered to the second state, the first graphic sequence indicating to the player that the existing matrix of symbol locations is now to simulate uni-symbol reels.

9. The gaming machine of claim 8, in which the presentation controller is further operable to display a second graphic sequence when the matrix of symbol locations is changed from the second state to the first state, the second graphic sequence indicating to the player that the existing matrix of symbol locations is now operable to simulate multi-symbol reels.

10. The gaming machine of claim 8, in which the first graphic sequence includes a step of adding dividers between adjacent symbol locations on the reel to indicate that the multi-symbol reels are being visually separated into uni-symbol reels.

11. The gaming machine of claim 7, in which the presentation controller is configured to alter the matrix of symbol locations to the second state in response to a trigger event in a game result in the first state.

12. The gaming machine of claim 7, in which the presentation controller is configured to alter the matrix of symbol locations to the first state in response to a trigger event in a game result in the second state.

13. The gaming machine of claim 7, in which the gaming machine is operable in the second state to receive a player game activation input and, in response, provide a game result by simulating spinning and stopping of the uni-symbol reels.

14. The gaming machine of claim 13 in which the player game activation input includes a wager entitled to the game result and a wager result.

15. The gaming machine of claim 7 further comprising a first set of game control scripts designed to control the multi-symbol reel simulators, and a second set of game control scripts designed to control the uni-symbol reel simulators.

16. The gaming machine of claim 15, in which the second set of game control scripts includes multiple scripts for conveying a single designated prize amount with a different sequence of events.

17. The gaming machine of claim 16, in which the presentation controller is further programmed to randomly select between the multiple scripts conveying the single designated prize amount.

18. The gaming machine of claim 7, further including, when changing the matrix of symbol locations to the second state, initiating the state of each simulated uni-symbol reel to maintain each symbol previously shown in the matrix of symbol locations over the course of the modification.

19. The gaming machine of claim 7, in which the uni-symbol reel simulators are operable in the second state to change the symbol displayed at their respective symbol location independently of any other symbol location in the matrix of symbol locations.

* * * * *